United States Patent Office 3,355,104
Patented Nov. 28, 1967

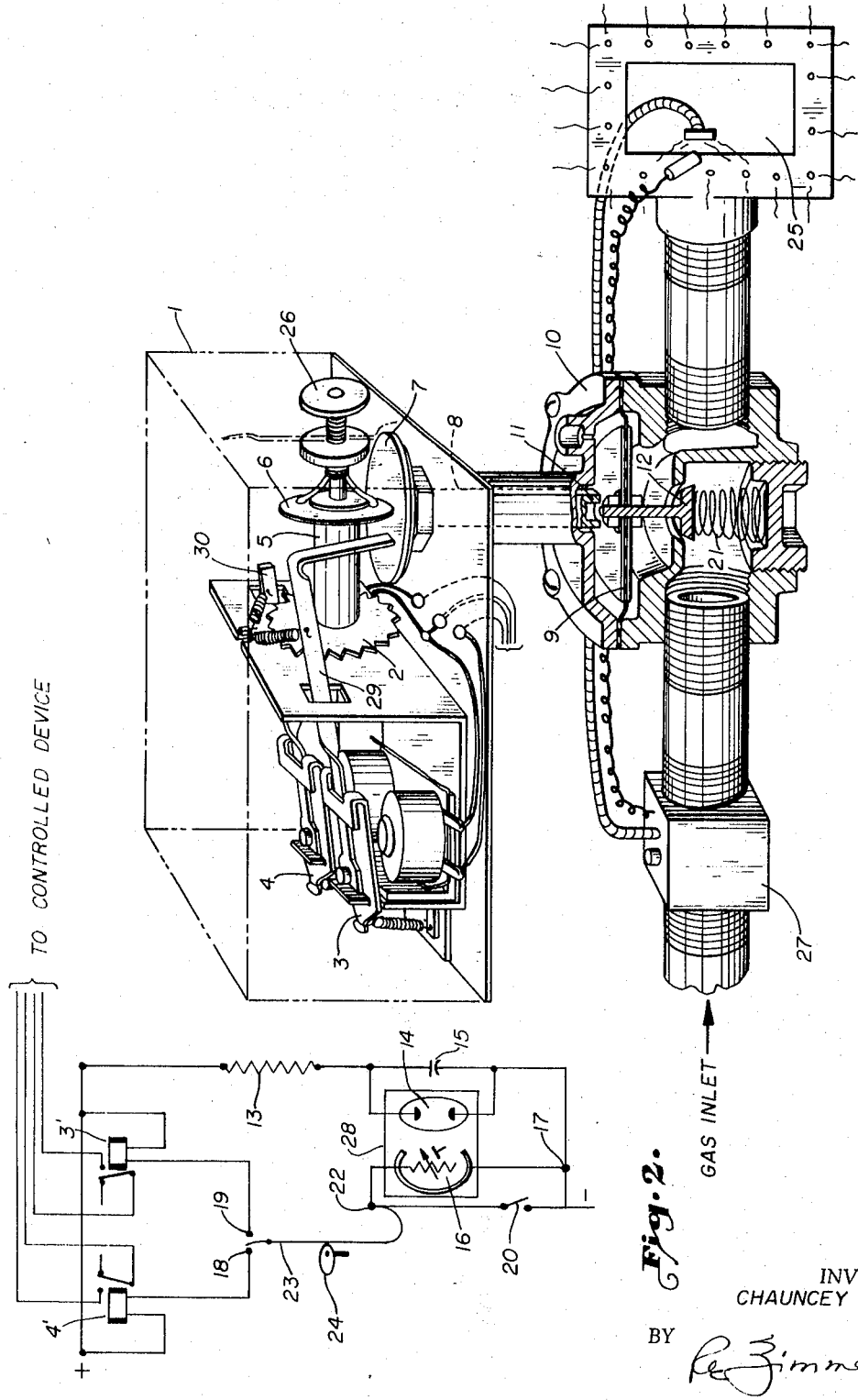

3,355,104
CONSTANT HEAT CONTROL SYSTEM
Chauncey Adams, Jr., Tulsa, Okla.
(3525 Randall Drive, Independence, Mo. 64050)
Filed Oct. 23, 1965, Ser. No. 503,999
4 Claims. (Cl. 236—77)

This invention relates to a new and improved system of controlling the flow of heating media in a heating system so as to control the physical environmental conditions which are desirable for the physical comfort of the people utilizing the heating system. This control system finds particular adaptability to heating systems by utilizing a flexible diaphragm control regulator valve which controls the rate of flow of fuel being used as the heating medium.

Many of the present thermostatic control systems which are used to control the temperature in the spaces to be heated employ a bi-metallic strip which will change position as the temperature varies. The temperature variation will move the strip in one direction or in the opposite direction, making contact with one of the contact buttons connected in line with operating solenoids. The solenoids are mounted in such a manner so as to actuate a rachet mounted on a shaft. Depending on which solenoid is actuated, the movement of the rachet will be either clockwise or counterclockwise. These thermostatic controlled systems in combination with various arrangements of rachet controls depend wholly on a continuous flow of electrical impulses to the base of the bi-metallic strip at all times, in a completely "on" and "off" system. Thus, when the bi-metallic strip by contacting one of the buttons 18 or 19, FIG. 1, completes the connection, a change in the position of the regulator valve will change the heating rate until satisfied and then completely shut off the heat supply. The present invention does not depend on a continuous flow of electrical current to function nor does it operate on the principle of "on" and "off" heat supply.

To control the temperature of a heated area by thermostatic control has been known for many years. Various types and designs of thermostats are in use today to control temperatures in closed areas but none of the known thermostats operate in the same manner or give the fine control of temperature regulation as will be disclosed herein. The known thermostatic control systems lack of finesse in precision control of regulating the flow of the fuel to obtain a minute variance in the room temperature. The thermostatic systems now in operation are designed to completely open and completely shut the valve regulator feeding the fuel to a burner. However, the majority of the thermostatic components in such thermostatic control systems require a continuous operating electrical impulse which continuously is changing the regulator valve. This type of control will cause constant fluctuation in the amount of heat being supplied into the heating system.

The present control systems cannot be adjusted to a degree of fine control because the various components of the thermostatic system do not function for "fractional correction" of the amount of fuel being supplied to the burner. However, this new and improved control system which I shall describe herein will alleviate these shortcomings.

The invention which is described herein eliminates the required spring tensions, magnetic forces or other physical action necessary in the conventional control circuits to prevent chattering. The present home systems with magnet loaded bi-metallic switches will achieve only a variance of control approximately within four degrees in temperature. My invention can control the temperature more precisely than the present conventional system now in home use. This is due to the operation of the free floating bi-metallic switch along with the other improved features which I shall describe. The impulse which operates the heat increasing or decreasing solenoid in this invention is only alive for one second, during a span of five minutes. The balance of the time, the solenoids remain in a non-operating position with the mechanical fuel valve attachment remaining at the last prescribed setting. This is due to the capability of the fine control by this system on the regulator valve. The mechanical setting of the regulator valve is always stationary until a signal is relayed through the system to change the mechanical setting of the regulator valve. Due to the finiteness of the adjustable controls, frequent changing of the regulator valve is eliminated.

The object of the present invention is to provide novel electrical means to provide exacting thermostatic control for controlling the environmental temperature of a closed area.

Still another object of this invention is to provide a thermostatic control system in combination with a modified regulator valve to provide for finite control of the flow of the heating media so as to give exacting constant control of room temperatures by having constant heat output from the burner.

Another object of this invention is to provide a means for adjusting when desired the regulator valve opening to admit maximum heating media to provide for maximum heating benefits and to give a quick change in the environmental temperature of the closed area to be heated.

Another object of this invention is to provide a thermostatic control system with a free floating bi-metallic control switch which controls environmental temperature to a finite degree.

FIGURE 1 illustrates the control box including solenoids and mechanical means to make necessary regulator valve changes.

FIGURE 2 illustrates an electrical wiring diagram showing the components of the thermostatic control device in combination with the operating solenoids in the control box.

To have a clearer understanding of this invention, it is understood that various types of thermostatic control systems are now marketed in which somewhat similar mechanical aspects of this invention are now in use. However, the preferred mechanical features of this invention are unique and are required for this invention to properly function. The particular features of the mechanical aspect of this invention shall be described in detail in the following paragraphs.

FIGURE 1 illustrates the control box 1 containing two solenoids 3 and 4, the purpose of which is to actuate movement of the rachet 2 in a circular direction. Solenoid 3 is positioned in the control box to actuate the rachet 2 through its extended arm 29 in a counterclockwise direction while solenoid 4 is positioned to actuate the rachet through its extended arm 30 in a clockwise direction. The rachet is mounted on a shaft 5 which extends longitudinally. Attached to the end of the shaft 5 is a precisely designed eccentric disk 6 which when moved in a circular direction counterclockwise presses against a round plate 7 mounted on a shaft 8 extending downwardly in a vertical direction. The rounded end of the shaft 8 presses on the metal support portion of a flexible diaphragm 9 in the upper chamber of the regulator valve 10. Extending through the upper chamber from the metal section of the flexible diaphragm is a short shaft 11, attached to the short shaft is a valve 12 facing upward and seated into the lower section of the upper chamber. Below the upper chamber is another chamber from which the heating media passes through the valve 12 and the upper chamber to the furnace burner 25. For proper functioning, the valve 12 is necessarily supported by a spring 21 in the base of the lower valve chamber.

FIGURE 2 illustrates the electrical components which make up the thermostatic device to properly relay the temperature changes desired. The preferred embodiment contains a supply of direct current, a resistor 13 in line to one connection of a neon bulb 14, a capacitor 15 in line with the other connection to the neon bulb. Together and sealed in a light tight box 28 is a neon bulb 14 and the photo-electric cell 16, one connection 17 being directly connected into one line of the electrical energy, the other connection 22 is connected to the base of the bi-metallic strip 23. The term "switch" and "strip" are used interchangeably to connote 23, FIG. 2. The solenoids 3' and 4' connect into the bi-metallic strip at contact points 18 and 19. Contact points 18 and 19 are each respectively connected to one side of each of two solenoids, the other side of the solenoids is connected to the other line of electrical energy.

*Operation*

The principle upon which this thermostatic control of the regulator valve operates in this invention is to make gradual changes in the amount of heat supplied during a certain interval of time and still continue to supply a measured amount of heat at all times. Such an operation will give more uniform heat throughout the area being heated. This is accomplished by having a finer, more accurate control on the movement or adjustment of the amount of heating media being supplied into the area to be heated. To operate the thermostatic control disclosed in this invention, direct current is supplied through resistor 13, FIG. 2, to capacitor 15 until it is charged to approximately 70 volts. There is no discharge of the capacitor 15 until enough electrical energy is stored to effectively light the neon bulb. The preferred embodiment would be to place a 30 meg. resistor in line with a 50 mfd. capacitor, with a neon bulb paralleling the capacitor. This comprises a relaxation oscillator with a time constant of approximately five minutes. The light from the neon bulb actuates and closes the circuit through the photo-electric cell. The closed circuit permits electricity to flow through the bi-metallic strip. Depending on whether the bi-metallic switch is in contact at position 18 or 19 will determine which solenoid is actuated. The extended arms of the solenoids motivate the rachet 2 turning the shaft 5 either clockwise or counterclockwise. If the bi-metallic strip is between contacts 18 and 19 and not touching either of the contacts, there being no temperature change desired, there will be no movement of the rachet 2 or the shaft 5. The preferred electronic circuit in the thermostatic control contains a 30 meg. resistor and a 50 mfd. capacitor which fires the neon bulb for 1 second every 5.5 minutes. This lights the neon light which actuates the photo-electric cell to close the electrical circuit to the solenoids, the bi-metallic strip 23 being in contact at 18 or 19.

The contacts are connected to two solenoids 3' and 4' FIG. 2 which actuate mechanical means to regulate the heating media in the heating system. However, if the thermostat eccentric adjustment screw 24, FIG. 2 which has been set for very low temperature or completely shut off, and a quick increase of temperature is desired, the desired temperature is set and provision is made by a quick response switch 20 for increasing the supply of heating media into the heating system instantly. As the temperature increases in the room, the automatic thermostatic control will gradually take over and adjust the supply of heating media accurately and sufficiently to maintain the temperature setting on the thermostat adjustment screw. The eccentric 6, FIG. 1, which controls the opening of the valve 12 in the regulator is very precise and the amount of heating media supplied can be measured with accuracy so that the necessity for thermostatic control adjustment to the fuel valve 12, FIG. 1, is reduced to a minimum. Not only will this give good economy in fuel consumption, but this system allows the use of a smaller quiet electric blower for circulation of the heated air in installations.

This invention has solved one of the problems which exists in the present-day control systems. Not only does this invention precisely control the heating media being used in furnaces today, but also solves the problem of "lighting off" a burner, particularly in gas-fired furnaces. In a finely regualted gas-firing system to light off a gas burner, it is necessary to get enough heating media to a burner immediately. This is provided for by the presence of the arm extension 29, FIG. 1, of the solenoid 3. This is an added function of this control for quicker ignition of the burner. When the burner is in a non-operating status valve 12, FIG. 1, is completely closed. When the electric thermostatic control indicates a change of temperature, the solenoid 3, FIG. 1, will actuate the arm extension, not only to open the valve, but in addition to open "momentarily" the valve completely to allow for proper ignition of the gas entering the burner. This is necessary to avoid an excess of unburned gas to escape in insufficient quantities to be properly ignited. This action is "momentary" and offers that extra spurt of gas for proper ignition. This action takes approximately one second, then the opening which is controlled by the automatic setting of the valve supplies the selected amount of fuel to the system.

Another feature which is provided in this system is the incorporation of switch button 20, FIG. 2. Assuming the bi-metallic strip is in position 19 this switch button by-passes the automatic control and closes the electric circuit to pass electrical impulses to solenoid 3' which closes and moves the rachet in a counterclockwise direction. Each impulse will move the rachet the distance of one notch. The movement of this rachet moves the precise eccentric wheel 16 also in a counterclockwise direction. Through mechanical means shown in FIGURE 1, the valve 12 is opened to a small degree by each movement of the rachet. In order to obtain ignition of the gas by the pilot light, a sufficient burst of gas must be flowing. This is accomplished by following the procedure set out in the above paragraph. If a great amount of heat is desired, the valve 12 can be opened full by repeated operation of switch 20, FIG. 2. The eccentric 6, FIG. 1, has a stop which limits its travel when the maximum or minimum opening of the valve has been reached. Another advantage which is present in this invention is that not only can the valve 12 be opened by using the switch, but the switch can also be used to close or adjust the valve 12 setting. This is accomplished by changing the directional flow of the electrical energy. Should the bi-metallic strip 23, FIG. 2, be in contact at 18, the solenoid 4' would be actuated and cause the valve to move toward the closing position.

Another feature which is incorporated in this invention is the manually controlled screw adjustment 26, FIG. 1. This provides for manually adjusting the valve opening through mechanical means should there be a failure in the automatic system. Included in this system is an automatic shut-off safety valve 27 which shuts off the total fuel supply in case the pilot goes out. This safety feature prevents gas asphyxiation in case of such a failure.

I have disclosed this invention describing only one thermostatic control in the regulating system. It should be understood that variations using more than one thermostatic control in individual rooms in combination with the mechanical control box is considered within the scope of this application.

While one embodiment of the present invention has been described in detail, it will be understood that other modifications and embodiments are contemplated as defined by the claims to be within the scope of this invention,

I claim:
1. In combination, a thermostatic control system for precisely controlling room temperature in a closed area, electrical means for furnishing electrical impulses including a source of direct current, electrical wire means to transmit the electrical current, a resistor, a capacitor, a neon light, a photo-electric cell, the said neon light and photo-electric cell being enclosed in a light tight box, connection means to transmit electrical impulses from the said photo-electric cell to a bi-metallic strip, contact means to transmit electrical impulses from the said bi-metallic strip to two solenoids with extension arms, one of the extension arms of solenoid being extended in a downward position to provide a full downward stroke opening a regulator valve momentarily, both of the said extension arms actuating mechanical means, the said mechanical means including a rachet mounted on a shaft, a precise eccentric wheel mounted on the end of said shaft, a second shaft actuated by the movement of said eccentric wheel to open and close a valve located in the valve regulator body.

2. In combination, a thermostatic control system for precisely controlling room temperature in a closed area, electrical means for furnishing electrical impulses including a source of direct current, electrical wire means to transmit the electrical current, a resistor, a capacitor, a neon light, a photo-electric cell, the said neon light and photo-electric cell being enclosed in a light tight box, a switch for by-passing the photo-electric cell, connection means to transmit electrical impulses from the said photo-electric cell to a bi-metallic strip, contact means to transmit electrical impulses from the said bi-metallic strip to two solenoids with extension arms, one of the extension arms of solenoid being extended in a downward position to provide a full downward stroke opening a regulator valve momentarily, both of the said extension arms actuating mechanical means, the said mechanical means including a rachet mounted on a shaft, a precise eccentric wheel mounted on the end of said shaft, a second shaft actuated by the movement of said eccentric wheel to open and close the valve located in the valve regulator body.

3. In combination, a thermostatic control system for precisely controlling room temperature in a closed area, electrical means for furnishing electrical impulses including a source of direct current, electrical wire means to transmit the electrical current, a resistor, a capacitor, a neon light, a photo-electric cell, the said neon light and photo-electric cell being enclosed in a light tight box, connection means to transmit electrical impulses from the said photo-electric cell to a free-floating bi-metallic strip, contact means to transmit electrical impulses from the said bi-metallic strip to two solenoids with extension arms, one of the extension arms of solenoid being extended in a downward position to provide a full downward stroke opening a regulator valve momentarily, both of the said extension arms actuating mechanical means, the said mechanical means including a rachet mounted on a shaft, a precise eccentric wheel mounted on the end of said shaft, a second shaft, actuated by the movement of said eccentric wheel to open and close a valve located in the valve regulator body.

4. In combination, a thermostatic control system for precisely controlling room temperature in a closed area, electrical means for furnishing electrical impulses including a source of direct current, electrical wire means to transmit the electrical current, a resistor, a capacitor, a neon light, a photo-electric cell, the said neon light and photo-electric cell being enclosed in a light tight box, connection means to transmit electrical impulses from the said photo-electric cell to a bi-metallic strip, contact means to transmit electrical impulses from the said bi-metallic strip to two solenoids with extension arms, one of the extension arms of solenoid being extended in a downward position to provide a full downward stroke opening a regulator valve momentarily, both of the said extension arms actuating mechanical means, the said mechanical means including a rachet mounted on a shaft, a precise eccentric wheel mounted on the end of said shaft, a second shaft actuated by the movement of said eccentric wheel to open and close a valve located in the lower section of the upper chamber of the valve regulator body, the said valve movement being regulated by a flexible diaphragm in the upper chamber of the said valve regulator body.

References Cited
UNITED STATES PATENTS

| | | | |
|---|---|---|---|
| 2,028,571 | 1/1936 | Smulski | 236—77 |
| 2,623,699 | 12/1952 | Smith | 236—78 |
| 2,815,500 | 12/1957 | Hance | 236—78 |

MEYER PERLIN, *Primary Examiner.*